United States Patent
Keränen et al.

(10) Patent No.: US 10,119,869 B1
(45) Date of Patent: Nov. 6, 2018

(54) METHOD FOR MANUFACTURING A STRAIN GAUGE DEVICE, A STRAIN GAUGE DEVICE, AND THE USE OF THE DEVICE

(71) Applicant: TactoTek Oy, Oulunsalo (FI)

(72) Inventors: Antti Keränen, Oulunsalo (FI); Mikko Heikkinen, Oulunsalo (FI); Vinski Bräysy, Oulunsalo (FI)

(73) Assignee: TACTOTEK OY, Oulunsalo (FI)

( * ) Notice: Subject to any disclaimer, the term of this patent is extended or adjusted under 35 U.S.C. 154(b) by 0 days.

(21) Appl. No.: 15/850,976

(22) Filed: Dec. 21, 2017

(51) Int. Cl.
| | |
|---|---|
| *G01C 7/00* | (2006.01) |
| *G01L 1/14* | (2006.01) |
| *G01F 23/22* | (2006.01) |
| *G01D 5/24* | (2006.01) |
| *G01G 7/00* | (2006.01) |
| *G01C 9/00* | (2006.01) |
| *G01C 9/06* | (2006.01) |

(52) U.S. Cl.
CPC .............. *G01L 1/14* (2013.01); *G01C 9/06* (2013.01); *G01D 5/24* (2013.01); *G01F 23/22* (2013.01); *G01G 7/00* (2013.01); *G01C 2009/062* (2013.01)

(58) Field of Classification Search
CPC ....... G01L 1/14; G01C 9/06; G01C 2009/062; G01D 5/24; G01F 23/22; G01G 7/00
USPC ...................... 73/862.626, 862.628
See application file for complete search history.

(56) References Cited

U.S. PATENT DOCUMENTS

| | | | | |
|---|---|---|---|---|
| 6,823,747 B2* | 11/2004 | Hasegawa | ............... | G01C 9/06 73/780 |
| 7,014,642 B1* | 3/2006 | Perone | ................... | A61B 17/44 606/122 |
| 2002/0154466 A1* | 10/2002 | Morino | ................. | H01H 35/24 361/211 |
| 2007/0062300 A1* | 3/2007 | Dorfman | ................. | G01B 7/18 73/776 |
| 2009/0255344 A1* | 10/2009 | Stuermann | ............ | G01L 19/141 73/754 |
| 2010/0158544 A1* | 6/2010 | Chabinyc | ............... | G03G 15/55 399/9 |
| 2014/0200834 A1* | 7/2014 | Ross | .................... | A43B 3/0005 702/41 |
| 2014/0331741 A1* | 11/2014 | Shah | ........................ | G01N 3/30 73/12.06 |
| 2016/0290880 A1* | 10/2016 | Lewis | .................... | G01L 1/2287 |
| 2017/0284880 A1* | 10/2017 | Beer | ................. | H01L 23/49811 |
| 2017/0311473 A1* | 10/2017 | Steinich | ................... | G01C 9/06 |
| 2018/0005733 A1* | 1/2018 | Shinotake | ............... | H01C 1/14 |

\* cited by examiner

*Primary Examiner* — Max Noori
(74) *Attorney, Agent, or Firm* — Robert P. Michal, Esq.; Carter, DeLuca, Farrell & Schmidt, LLP

(57) ABSTRACT

A method for manufacturing a strain gauge device and a strain gauge device are presented. The method includes obtaining a first substrate, preferably a first formable substrate film for accommodating electronic components, printing by a printed electronics method, such as by screen printing or inkjet printing, a strain gauge on the first substrate, and molding, preferably by utilizing injection molding, a molded material layer embedding the strain gauge. The strain gauge device may comprise two, preferably formable, substrate films between which the strain gauge and the molded material layer may be arranged.

47 Claims, 9 Drawing Sheets

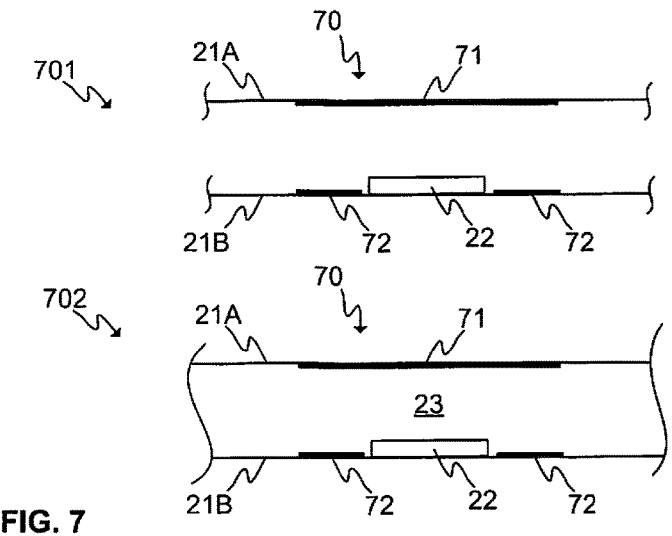
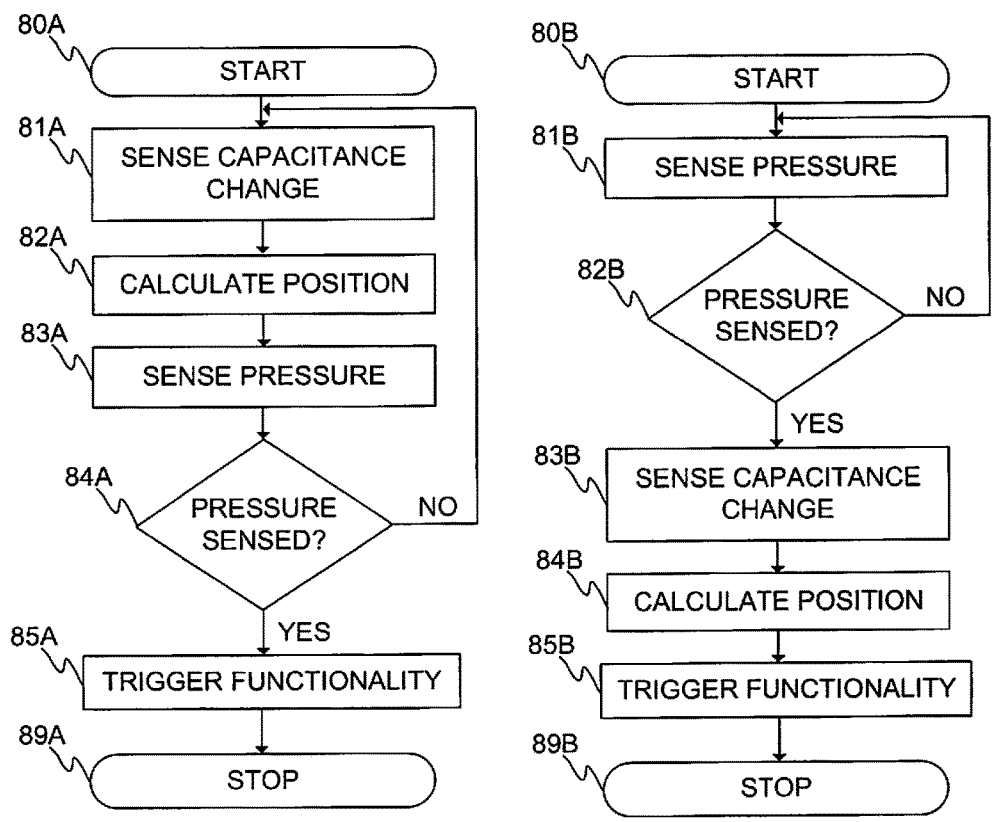
FIG. 7
FIG. 8A
FIG. 8B

METHOD FOR MANUFACTURING A STRAIN GAUGE DEVICE, A STRAIN GAUGE DEVICE, AND THE USE OF THE DEVICE

The project leading to this application has received funding from the European Union's Horizon 2020 research and innovation programme under grant agreement No 725076.

TECHNICAL FIELD

The present invention concerns in general the technical field of electronics, associated devices, structures, the use of thereof and methods of manufacture. Especially, however, not exclusively, the present invention concerns manufacturing of strain gauge devices utilizing molding, such as injection molding, and such devices and the use of thereof.

BACKGROUND INFORMATION

Generally, there exists a variety of different multilayer assemblies and structures in the context of electronics and electronic products. The motivation behind the integration of electronics and related products may be as diverse as the related use contexts. Relatively often size savings, weight savings, material savings, cost savings, performance gain or just efficient cramming of components is sought for when the resulting solution ultimately exhibits a multilayer nature. In turn, the associated use scenarios may relate to product packages or food casings, visual design of device housings, wearable electronics, personal electronic devices, displays, detectors or sensors, vehicle interiors, antennas, labels, vehicle electronics, furniture, etc.

Multilayer structures are obtainable, for example, by utilizing a substrate, such as a circuit board or even a plastic film, which may be provided with electronics and overmolded by plastics so as to establish the multilayer structure with the electronics at least partially embedded in the molded layer. Accordingly, the electronics may be concealed from the environment and protected against environmental conditions such as moisture, physical shocks, or dust, whereas the molded layer may further have various additional uses in terms of aesthetics, transfer medium, dimensioning, etc.

Electronics such as electronic components, integrated circuits (ICs), and conductors, may be generally provided onto a substrate element by a plurality of different techniques. For example, ready-made electronics such as various surface mount devices (SMD) may be mounted on a substrate surface that ultimately forms an inner or outer interface layer of a multilayer structure.

Additionally, technologies falling under the term "printed electronics" may be applied to produce electronics directly and essentially additively to the associated substrate. The term "printed" refers in this context to various printing techniques capable of producing electronics/electrical elements from the printed matter, including but not limited to screen printing, flexography, and inkjet printing, through a substantially additive printing process. The used substrates may be flexible, which is, however, not always the case.

Electronic assemblies are used in variety of different applications. In many of these applications, sensors, switches and/or devices for monitoring and/or responding to changes in the pressure affecting them, for example pressure sensors or mechanical push buttons, are desired features, such as in many control systems or user interfaces utilizing electronics. The sensors may be based on monitoring capacitance, inductance or resistance, or based on changes in optical properties or on various other known techniques. The devices utilizing the sensors may have various forms, and be utilized for different purposes and in different environments.

One example of a technical field in which, for example, mechanical push buttons are being utilized is automotive industry. Vehicles can have a variety of electronic devices connected to the common electrical system of the vehicle. The devices are typically controlled by using devices which monitor the pressure affecting them and/or operate in response to a change in said pressure or by applying force, such as in case of mechanical push buttons. Furthermore, capacitive switches may be utilized as means for controlling a device in the vehicle. However, in those conditions capacitive non-contact electric switches are prone to error functions caused by electromagnetic interference or erroneous detection by the capacitive sensor, or system thereof, in response to a hand movement which was not intended to cause said detection or action by the capacitive sensor.

Typical mechanical push buttons can also be used, however, they tend to be large, costly and exposed to dirt, such as grease from user's fingers, and can affect adversely otherwise elegant interior surface of the vehicle. When integrating mechanical push buttons to surrounding structures, the structure is designed so that the button can be arranged and fixed to the structure and that moving of the push button in response to the pressure applied to it is made possible. Typically, this is done by having the push button or a rotatable switch separated from the surrounding structures, for example, protruding from the structure or at least having a gap enabling the movement with respect to the structure. The buttons or switches can be overlaminated or a separate protective layer can be arranged to cover them in order to protect them from dirt and to provide more uniform outer surface with respect to the surrounding structure. The overlaminate or the separate protective layer is such that it enables to use of the button or the switch, that is, it is highly flexible in order to enable the operating of the button or the switch. However, the laminate or layer can easily be damaged or worn out when used repeatedly. The laminate or the layer can easily become detached from the button or the switch, thus deteriorating the performance of the device.

There is thus still a need for developing a method for manufacturing pressure sensing switches and devices, and for devices thereof, which are less prone to interferences and operate more reliably than the known attempted solutions.

SUMMARY

An objective of the present invention is to provide a method for manufacturing a strain gauge device, a strain gauge device, as well as the uses thereof, a weighing device, and a level indicator device. Another objective of the present invention is that the method facilitates the manufacturing of strain gauge devices and that the strain gauge devices are durable and operate reliably.

The objectives of the present invention are reached by a method, a strain gauge device, and the uses thereof, and a weighing device, and a level indicator device, as defined by the respective independent claims.

According to a first aspect, a method for manufacturing a strain gauge device is provided. The method comprises obtaining a first substrate, preferably a first formable substrate film for accommodating electronic components. The method also comprises printing by a printed electronics method, such as by screen printing or inkjet printing, a strain gauge on the first substrate. The method further comprises molding, preferably by utilizing injection molding, a molded material layer embedding the strain gauge.

The method may comprise forming, such as thermoforming or cold-forming, the first substrate comprising the printed strain gauge.

The method may comprise obtaining a second substrate, preferably a second formable substrate film, wherein the molding comprises molding the molded material layer between the first and second substrates, such as between two substrate films.

The strain gauge may be a first strain gauge and the method may comprise printing at least one second strain gauge on the second substrate at least partly at a corresponding position with respect the first strain gauge.

At least one of the first and second substrates, such as substrate films, may be flexible.

The method may comprise arranging a controlling unit for controlling operation of the strain gauge on the first substrate or the second substrate, and arranging electrical connection between the controlling unit and the strain gauge, such as by a printed electronics method. The molding may preferably comprise molding the molded material layer to embed the controlling unit.

The method may comprise arranging a capacitive sensing device, such as capacitive sensing elements of a capacitive sensor, on the first and the second substrate.

The first substrate film may comprise metal, preferably having high resistivity, such as higher than or equal to 0.1 micro-ohm/m. The method may comprise providing an insulating layer, such printing a dielectric layer with dielectric ink, on the first substrate, and printing the strain gauge on said insulating layer.

According to a second aspect, a strain gauge device is provided. The strain gauge device comprises a printed strain gauge on a first substrate, such as on a substrate film, wherein the printed strain gauge is embedded in a molded material layer.

The strain gauge device may comprise at least three printed strain gauges and the device may be configured for positioning a pressure applied to the first substrate based on the at least three printed strain gauges by triangulation. The applied pressure as referred herein refers to deviation of pressure at a certain point or area relative to the pressure of the surrounding areas. This may be, for example, a pressure increase on a small area due to a pushing motion by user's finger.

The strain gauge device may comprise a second substrate, such as a formable second substrate film, wherein the molded material layer embedding the strain gauge is arranged between the first and second substrates.

The strain gauge may be a first strain gauge on the first substrate and the device may comprise at least one second strain gauge printed on the second substrate at least partly at a corresponding position with respect the first strain gauge.

The strain gauge device may comprise a controlling unit on the first or the second substrate film and arranged in electrical connection with the strain gauge.

The first substrate, such as a formable substrate film, comprising the strain gauge maybe formed to a three-dimensional (3D) shape.

The strain gauge may be configured for use as a heating element.

At least the first substrate may be flexible.

The strain gauge device may further comprise a capacitive sensing device, such as comprising two capacitive sensing elements.

The strain gauge device may be configured such that the capacitive sensing device is configured to provide a first trigger signal, and the resistance of the strain gauge is configured to be monitored in response to the first trigger signal.

The strain gauge device may be configured such that the resistance of the strain gauge is configured to be monitored and to provide a first trigger signal, and the capacitive sensing device is configured to be monitored in response to the first trigger signal.

The first substrate may comprise or essentially consist of one of the following materials: plastics, polymer, polycarbonate, polycarbonate-acrylonitrile butadiene styrene, poly (methyl methacrylate), polyimide, copolymer of methyl methacrylate and styrene monomer (MS resin), polyethylene terephthalate, wood, leather or fabric. According to various embodiments, the substrate may comprise or essentially consist of at least one natural and often, but not necessarily, organically grown material selected from the group consisting of: wood, solid wood, veneer, plywood, bark, tree bark, birch bark, cork (comprising phellem layer of bark tissue), natural leather, and natural textile or fabric material (which may be weaved or knitted, or otherwise produced, from natural fibers, for example) such as cotton, wool, linen, silk, or alike.

The first substrate may comprise metal, such as a thin metal layer, preferably having high resistivity, such as higher than or equal to 0.1 micro-ohm/m. The device may further comprise an insulating layer, such printed dielectric layer of dielectric ink, on the first substrate, and the printed strain gauge may be on said insulating layer.

According to a third aspect, a hands-on-off detection sensor is provided. The hands-on-off detection sensor comprises the strain gauge device according to the second aspect.

According to a fourth aspect, a steering wheel is provided. The steering wheel comprises the hands-on-off detection sensor according to the third aspect.

According to a fifth aspect, the use of the strain gauge device according to the second aspect for hands-on-off detection is provided.

According to a sixth aspect, a weighing device is provided. The weighing device comprises the strain gauge device according to the second aspect.

According to a seventh aspect, the use of the strain gauge device according to the second aspect for weighing is provided.

According to an eighth aspect, a level indicator device is provided. The level indicator device comprises the strain gauge device according to the second aspect.

According to a ninth aspect, the use of the strain gauge device according to the second aspect for level indication is provided.

The utility of the present invention arises from a plurality of issues depending on the embodiment. Strain gauge device may be manufactured easily by printing the strain gauge or gauges on a substrate. Furthermore, the strain gauge and its characteristics, such as value of resistance or resistivity, may easily be adjusted by the use of a certain ink and/or by designing the geometry of the strain gauge so that desired characteristics are obtained. By molding a material layer over or to embed the strain gauge, the strain gauge is protected from the environment and interferences, is durable and operates reliably. Furthermore, the mechanical coupling of the strain gauge to the surface on which the force or pressure to be sensed as strain by the gauge is intended to be applied is ensured by utilizing the combination of the printed strain gauge and the molded material layer. Furthermore, in addition to the proper mechanical coupling, the molded material layer advantageously transmits the force to the gauge and thus the strain gauge device can be made sensitive to the force. Thus, the present invention facilitates the manufacturing of strain gauge devices having abovementioned properties as well as provides such advantageous devices.

The terms "first", "second", "third", etc. do not denote any order, quantity, or importance, but rather are used to distinguish one element from another.

The exemplary embodiments of the present invention presented herein are not to be interpreted to pose limitations to the applicability of the appended claims. The verb "to comprise" is used herein as an open limitation that does not exclude the existence of also un-recited features. The features recited in depending claims are mutually freely combinable unless otherwise explicitly stated.

The novel features which are considered as characteristic of the present invention are set forth in particular in the appended claims. The present invention itself, however, both as to its construction and its method of operation and the uses thereof, together with additional objectives and advantages thereof, will be best understood from the following description of specific embodiments when read in connection with the accompanying drawings.

BRIEF DESCRIPTION OF FIGURES

The embodiments of the present invention are illustrated by way of example, however, not by way of limitation, in the figures of the accompanying drawings which are briefly described in the following.

FIG. 7 illustrates schematically a strain gauge device according to an embodiment of the present invention.

FIGS. 8A and 8B illustrate examples of the operation of the strain gauge device according to various embodiments of the present invention.

DETAILED DESCRIPTION

Figure 1:
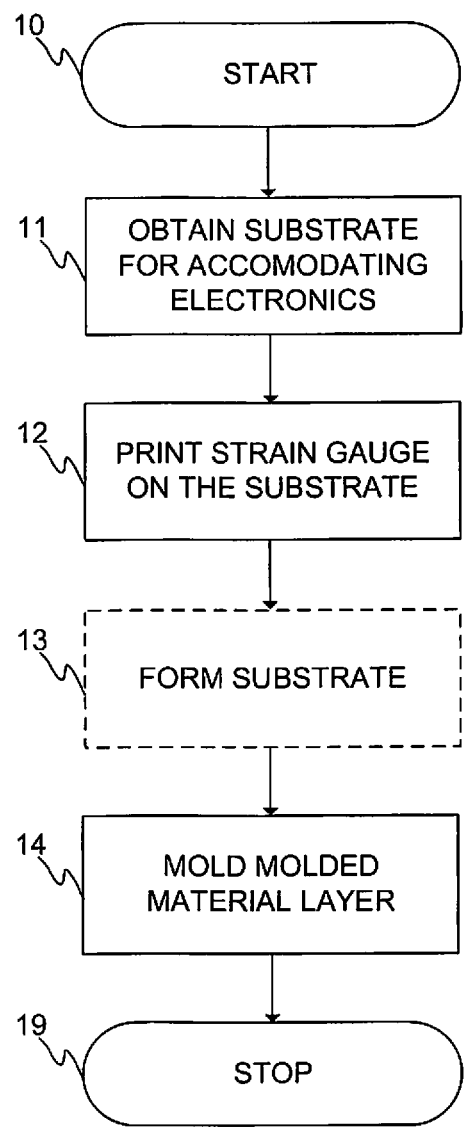
FIG. 1 illustrates a flow diagram of a method according to an embodiment of the present invention.

FIG. 1 illustrates a flow diagram of a method according to an embodiment of the present invention. At step 10, refer-ring to a start-up phase, necessary tasks such as material, component, such as electrical contact pads, conductors, electronics and connectors, and tool selection, acquisition, calibration and other configurations may take place. Specific care must be taken that the individual elements and material selections work together and survive the selected manufacturing process and possible target product whereto the structure or arrangement may be disposed, which is naturally preferably checked up-front based on the manufacturing process specifications and component data sheets, or by investigating and testing the produced prototypes, for example. Molding, such as injection molding, In-mold Decoration (IMD)/In-mold Labelling (IML), lamination, and/or printing equipment, such as utilizing screen printing or inkjet printing, among others, may be thus ramped up to operational status at this stage.

At step 11, a substrate, preferably a formable substrate film or sheet, such as for accommodating electronics, may be obtained. Optionally, prior to or at step 11, decorations, graphical indications, colors etc. may be produced onto the film by printing, for instance. This may be omitted or position thereof altered in the method flow. Alternatively or in addition, other layers such as a protective layer could be provided with such features. For example, screen printing or inkjet printing may be applied. Decorative or indicative (e.g. instructive) features may be generally provided using IMD/IML compatible methods. Ready-made substrate material, e.g. roll of plastic film, may be acquired and optionally processed such as coated, colored (if not initially of desired color or e.g. optimum degree of transparency or translucency), carved, embossed, shaped, etc., or the substrate itself may be in-house produced from scratch by molding, such as injection molding, or other methods from the desired starting material(s).

In various embodiments, the substrate may be formable. It may substantially be of formable material(s) such as thermoformable material, or at least comprise a formable layer. Initially potentially substantially planar, e.g. sheet like (extends considerably more in xy-directions, whereas the thickness or z-dimension is smaller and essentially constant) first substrate may be thus formed utilizing a suitable forming method such as thermoforming to exhibit a desired, at least locally three-dimensional (3D) shape (varying thickness, i.e. varying dimensions in z direction) with e.g. protrusion or recess shapes established, prior to molding or during it.

The material layers such as first substrate and, optional, second substrate may be processed and shaped according to the requirements set by each use scenario. They may exhibit e.g. a rectangular, circular, or square general shape. They may be substantially imperforate or contain recesses, notches, vias, cuts or openings, optionally filled with other material(s), for various purposes such as attachment to other elements, conducting electricity and e.g. related electrical power or other signals, fitting electronics or other components, provision of passages or thinned portions for light or other radiation, fluid, etc.

The substrate(s) as well as plastic layer(s) or potential further layers (paint, ink, film(s), etc.) may be configured to exhibit a desired color or graphical pattern, which may be externally perceivable. For example, IML procedures may be utilized to arrange embedded graphics in the structure.

The, preferably formable, the substrates, such as film(s) or sheet(s), may be flexible. The substrates may comprise or essentially consist of e.g. plastics/polymer, such as Poly Carbonate (PC), Poly Carbonate/Acrylonitrile butadiene styrene (PC/ABS), Poly Methyl Methacrylate (PMMA), polyimide, a copolymer of Methyl Methacrylate and Styrene (MS resin), Polyethylene Terephthalate (PET), or metal. The substrate film(s) or sheet(s) may comprise organic or biomaterials, such as wood, leather or fabric, or a combination of any of these materials with each other or with plastics or polymers, or metals. The substrates, such as film(s) or sheet(s), may also be further processed, such as shaped, formed, coated, etc.

The substrates may include relief forms or shapes such as protrusions, ridges, grooves, or recesses relative to the surface plane, optionally through holes. These features may be utilized to accommodate or at least partially embed elements such as conductors, electric components, etc. within the substrate(s). Similar features may be present in the protective layer.

According to an embodiment of the present invention, at step 11, two, preferably flexible, substrates, such as films or sheets, may be obtained. The substrates may be similar or different relative to each other. One or both may be for accommodating electronics, such as electronic components or conductors or conductive areas, e.g., patches or electronic contact pads. The substrates may be essentially two-dimensional or planar, sheet like, for instance (naturally having a finite thickness, however, small in dimension relative to the other two dimensions forming the planar-like shape).

At step 12, strain gauge or gauges may be printed on the substrate or substrates. This may entail using any known printing method, such as screen printing or inkjet printing. The ink is advantageously electrically conductive ink which may be transparent, or transparent to some degree or opaque.

Regarding the properties of the conductive ink, it may be a composition comprising various materials such as electrically conductive material or materials, and a binder material or composition, and a solvent (which evaporates in right circumstances after the printing). The conductive material may be, for example, silver, carbon, or graphene. Polymer material may be used as the binder. Manufacturing the strain gauge by printing provides advantages through the use of a suitable conductive ink, that is, by adjusting the content of the ink so that the strain gauge exhibits desired properties in use, such as resistivity and/or the change of resistivity in response to strain. For example, the amounts of different conductive particles with respect to each other may be adjusted. Alternatively or in addition, the ratio of the amount of conductive particles to the amount of binder may be adjusted, for instance. By suitable selection of said amounts, the electrical and/or mechanical properties of the ink may be adjusted to be such as desired.

According to an embodiment of the present invention, the ink being used is soft ink material. By utilizing soft ink material known to a person skilled in the art, it is avoided that the conductors, for instance, make the structure itself more rigid and, thus the strain gauge device less sensitive to deformation due to the force or pressure directed to the device. At step 12, the strain gauge or gauges and elements thereof, such as contact pads, traces, patches, coil-like structures or conductors may be provided to a desired location or locations on a, preferably flexible, substrate(s), such as film or films or sheet(s), by printing, for example, and electronic components may be attached by appropriate mounting technique, respectively. Flexible printing circuits (FPC) structure may be thus formed. Mounting may include using adhesive, paste and/or conductive ink for establishing and securing the desired mechanical and electrical connections, for instance. Steps 11 and 12 may be executed repeatedly or alternately, depending on the embodiment, whereupon their separation into dedicated execution phases is not always necessary or even possible.

The strain gauge or gauges may, preferably, be electrically conductive traces, patches or planar coils, such as comprising copper, metal mesh, indium tin oxide (ITO) or similar.

At an optional step 13, forming, such as thermoforming or cold forming, e.g., by press forming or using vacuum or pressure, may take place. During the forming, the, preferably formable, substrate(s), for example, a flexible substrate film, may be shaped to a desired substantially 3D shape utilizing a mold structure. If some electronic components have been arranged on the substrate(s) to be formed, they shall have been disposed preferably such as to avoid locations of greatest stress occurring during forming, such as the locations of greatest pressure or curvature.

Forming may take place after providing at least portion of the circuitry to the first substrate in order to avoid or at least reduce complex 3D assembly of electronics. Forming may still take place prior to molding, e.g. as a separate process step, the plastic layer upon the substrate and circuitry provided thereon to at least partially overmold the same, using e.g. injection molding. However, in some embodiments forming may be executed in connection with molding. To facilitate or enhance such forming with e.g. wooden substrates such as veneer or plywood, the substrate may be first dampened.

At step 14, the strain gauges printed on the substrates, such as film or films, may be arranged into a cavity defined by a mold structure. This may be implemented by utilizing a mold structure and arranging the substrates, such as substrate films, if two, on opposite sides of the cavity of the mold structure after which the mold structure is prepared for molding, such as by bringing the cavity plates or mold parts together to form the mold cavity. At 14, a preferably plastic layer, e.g. of thermoplastic, thermosetting, elastomeric material, polymer, organic, biomaterial, composite, such as organic or graphic, as well as any combination thereof, is molded, preferably using injection molding technology. By molding the material layer over the strain gauge provides advantage that the mechanical coupling of the strain gauge to the molded material layer becomes strong and durable, and the molded material layer provides good medium for transferring the force through it to the strain gauge to be sensed as strain (and through change in resistance of the gauge).

The molded layer may generally incorporate, among other options, elastomeric resin. In more detail, the molded layer may include one or more thermoplastic materials that include at least one material selected from the group consisting of: PC, PMMA, ABS, PET, nylon (PA, polyamide), PP (polypropylene), TPU (thermoplastic polyurethane), polystyrene (GPPS), TPSiV (thermoplastic silicone vulcanizate), and MS resin. In some embodiments, thermoset materials may be alternatively or additionally utilized together with suitable molding methods such as reactive molding. Steps 13 and 14 may also be performed substantially simultaneously, for example, when the substrates, such as film or films, have been arranged into the mold cavity and when the molding material is being injected into the cavity by utilizing high pressure which then forms the substrates into a 3D shape or shapes, that is, one or both of them.

At step 19, the method execution is ended. The manufactured strain gauge device may be taken out of the mold structure once the molded material has been solidified enough. The time period for the solidification may be affected, for example, by the temperature of the molding material when being injected. By printing to substrate and further molding the substrate, the strain gauge(s) is/are tightly secured to the structure subject to stress (by pressing, for instance), thus response better in comparison to e.g. post-laminated structures; especially such structures where strain gauges are positioned onto post-laminated fascia member.

With respect to using conventional strain gauges, the use of printed strain gauges is especially advantageous because the pressure caused by the molding process may be so high as to cause the conventional strain gauge to become damaged or at least lose sensitivity for strain as the molding material surrounds and presses against the gauge. Furthermore, the strain gauge, especially when printed on the second substrate on opposite side of the molded material layer with respect to the outer surface which is intended to receive the pressure to be sensed, is mechanically better coupled to said outer surface than in case of using a separate plastic layer or laminated layers on top of the strain gauge. Said better attaching provides the effect that the pressure applied to said outer surface on opposite side of the molded material layer is being transmitted to the strain gauge through the molded material layer better than in case of using the laminated structure.

In various embodiments, the substrate(s) may comprise or essentially consist of at least one natural and often, but not necessarily, organically grown material selected from the group consisting of: wood, solid wood, veneer, plywood, bark, tree bark, birch bark, cork (comprising phellem layer of bark tissue), natural leather, and natural textile or fabric material (which may be weaved or knitted, or otherwise produced, from natural fibers, for example) such as cotton, wool, linen, silk, or alike. As being clear, some of the above options overlap and may occur simultaneously with reference to e.g. wood and veneer or plywood. In various embodiments, the first substrate indeed comprises or at least primarily consists of organic, biological, biomaterials, or alike, or any combination of these materials with each other and possibly other material(s), optionally carbon-based material(s) and/or various plastics. In case of wooden substrate, a lacquer layer or a further molded material layer may be provided on the surface of the wooden substrate. Further molded material layers may be provided on the various materials used in the substrate in various embodiments of the present invention.

In various embodiments, the first substrate or at least a sub-portion such as a wooden, textile, leather or other organic, natural base layer thereof, may be less than about few (e.g. 2-6) mm thick, more preferably less than about 1 mm thick, even more preferably less than about 0.5 mm thick, and most preferably less than about 0.3 mm thick. In case the first substrate contains e.g. the aforesaid textile, leather, or wooden layer of e.g. veneer or plywood, and at least one further layer of e.g. plastic material (a plastic film such as a thermoplastic film, for example), the overall thickness of a resulting substrate construction may still at least locally remain within the above limits or be slightly greater, typically max one or two millimeters greater, depending on the thickness of the substrate. The functional characteristics of the strain gauge device can be affected by the properties of the used ink for printing (as also described hereinearlier), by the geometry and/or the size of the strain gauge, the material of the substrate, length, width and thickness of the conductors of the strain gauge and, therefore, as a combination of two or more of the abovementioned features, the resistance of the strain gauge or resistivity of the parts of the strain gauge. The abovementioned features alone or in combination may also affect how the resistance of the strain gauge changes in respect to applied strain/pressure/force.

The strain gauge may be utilized in sensing of pressure by coupling the terminals of the strain gauge to a controlling unit, such as a microcontroller, for instance, via analog-to-digital (AD) converter, which may be separate AD converter or converters, or comprised in the microcontroller. The microcontroller and/or the AD converter may be chosen based on the properties of the strain gauge, for example based on its resistance. On the other hand, the strain gauge may be designed by taking into consideration the properties of the microcontroller and/or AD converter to be used to operate the strain gauge device, for example, by the appropriate geometry or dimension of the strain gauge in order to match the electrical parameters, such as impedance, so that separate amplifier may not be required, but rather a simple microcontroller is sufficient to operate the strain gauge.

Strain gauge or gauges may be used as a sensing device by utilizing an excitation voltage applied to the terminals of the strain gauge(s). The excitation voltage may be applied from any suitable voltage source, for example, producing output voltage of 5 V or 12 V. The change of resistance may be sensed, for example, by a Wheatstone bridge configuration or any other suitable configuration for measuring imbalance of between some of the resistances in the configuration in order to measure the change in the resistance of the strain gauge.

The strain gauge of the strain gauge device according to an embodiment of the present invention may easily be designed to exhibit any value of resistance, for example by suitable dimensions, and thus, to be used in connection with certain resistances comprised in the measuring configuration, such as a Wheatstone bridge configuration.

The strain gauge device may be utilized for sensing pressure on the device by determining a gauge or strain factor which is the ratio of the relative change in electrical resistance to the mechanical strain. According to an embodiment of the present invention, the strain factor of 0.01-0.2, that is, of the relative change in electrical resistance to the mechanical strain, may be utilized for determining the presence of pressure on the device.

The measurement arrangement or system comprised in or arranged in connection with the strain gauge device may preferably comprise a controlling unit or a microcontroller comprising at least a processing unit or a processor. The controlling unit may be configured to measure the strain directed to the strain gauge by an external object, such as user's finger, or alternatively the strain gauge device may be configured on measuring the strain present in the structure and detecting any changes in it. The value of the resistance of the strain gauge may be continuously measured and, if the device is utilized as a push button or a switch, the action may be performed if the value of resistance exceeds or goes under a threshold value. Furthermore, the threshold value may need to be adjusted based on temperature or due to aging, or "creeping", of the strain gauge and the resistance value thereof. The resistance value and/or the change thereof in response to the strain may need to be calibrated regularly or randomly or when needed. Alternatively or in addition, the operation of the device may be based on detecting by measurement a transient in the resistance value. Furthermore, the transient may be characterized and compared to time domain or frequency domain model of pressing action of a person. This may comprise defining in the model and regarding the measured signal duration of the increased strain and/or certain slopes and/or durations for the rising and/or falling edge of the measured resistance (that is, the strain).

Figure 2:
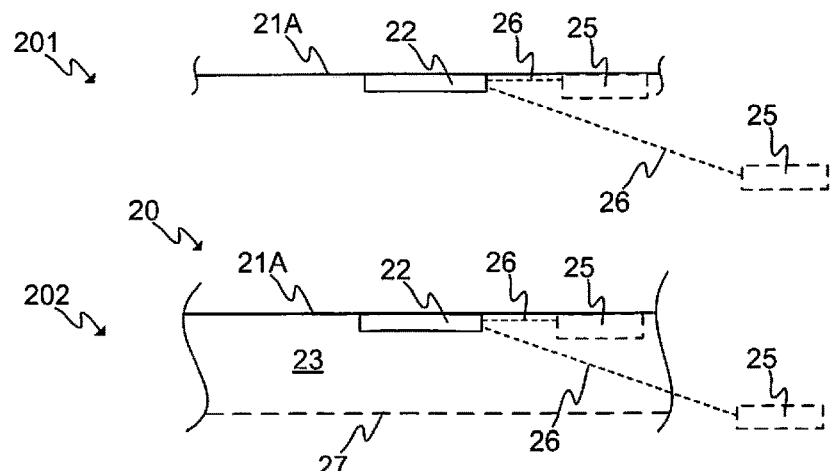
FIG. 2 illustrates schematically a strain gauge device according to an embodiment of the present invention.

FIG. 2 illustrates schematically a strain gauge device 20 according to an embodiment of the present invention. First, a first substrate 21A, such as a planar substrate, which may preferably be formable, for accommodating electronic components, may be obtained at 201. A strain gauge 22 may then be arranged on the first substrate 21A, preferably, by printing, such as screen printing or inkjet printing. Next, at 202, it is illustrated that the strain gauge 22 of the strain gauge accommodated first substrate 21A may be overmolded with or embedded into a molded material layer 23. This may be done by using a molding device, such as utilizing injection molding. Other edges 27 of the molded material layer 23 may be defined, for example, by the molding cavity of the molding device, or the structures of mold thereof.

Furthermore, a controlling unit 25, such as a microcontroller 25, may be arranged in electrical connection 26 to the strain gauge 22 as illustrated in FIG. 2. The microcontroller 25 may be arranged on the first substrate film 21A, and thus also embedded into the molded material layer 23, or to some other place, for example, external with respect to the molded material layer 23.

The strain gauge device 20 according to various embodiments of the present invention, may comprise more than one strain gauge 22. The strain gauges 22 may be printed parallel to each other on the first substrate film 21A. However, the strain gauges 22 may alternatively or in addition be provided on top of each other such that one strain gauge 22 is provided onto the first substrate film 21A whereas another strain gauge 22 is printed on said one strain gauge 22 by having an electrically insulating material provided therebetween, for example, by printing. The electrically insulating material may be provided, for example, by printing the electrically insulating material on said one strain gauge 22 prior to printing said another strain gauge 22 on the electrically insulating material at corresponding parts with respect to said one strain gauge 22. Thus, there may be several strain gauges 22 at one location which may be utilized separately to monitor the strain or applied pressure/force at that location. Furthermore, recesses and protrusions may be utilized for directing the force to the strain gauge 22 to be sensed as strain. Recesses and protrusions may be utilized for indication the location of, for example, a button or a slider in case the strain gauge 22 is being utilized as a part of a button or a switch. Furthermore, the recesses and/or protrusions may be advantage for users with visual impairment.

According to various embodiments of the present invention, the strain gauge device 20 may be configured such that the magnitude of strain measured by the strain gauge 22 may utilized as indicating the intensity of the command by a user, for instance. The device 20 may thus be configured, for example, to control an actuator for moving car window up and/or down. The actuator may begin to lower or the raise the window in response to the strain gauge device 20 sensing pressure applied. However, the magnitude of the strain measured by the strain gauge device 20 may additionally be used to control the speed of lowering or raising the window. Thus, the presence of strain may be used as a switching command and the magnitude measured to indicate the gain or intensity of the action to be performed.

According to various embodiments of the present invention, the strain gauge 22 may be used as a heating element. In these embodiments, the strain gauge 22 should be designed to withstand the desired temperature value or the power injected to the strain gauge 22 in order to raise the temperature of the strain gauge 22 should be kept low enough in order not to damage the strain gauge 22. The heating element may be used, for example, in a steering wheel in which the strain gauge 22 is also being used for hands-on-off detection, that is, to detect when user's hand or hands are actually on the steering wheel.

The resistance of the strain gauge 22 may vary as a function of temperature. The effect of temperature on the resistance of strain gauge 22 according to an embodiment of the present invention may be compensated, for example, by varying the level of excitation voltage applied to the strain gauge 22 based on the temperature affecting the strain gauge 22. This may be implemented, for example, by configuring the microcontroller or the AD converter or the voltage source, whichever is used to provide the excitation voltage, to regulate the excitation voltage of the strain gauge 22 based on the temperature. According to an embodiment of the present invention, the temperature compensation may be implemented by providing a reference resistor separated by a distance from the strain gauge 22, preferably, on the same or similar substrate on which the strain gauge 22 is printed on and overmolding the reference resistor by the molded material layer 23, the temperature behavior of the reference resistor is thus inherently similar to the temperature behavior of the strain gauge 22. This may then be utilized in temperature compensation of the strain gauge 22. The reference resistor as described hereinabove may itself also be a strain gauge 22. There may be one or several reference resistors which may be used for the temperature compensation.

Effect of temperature on the strain gauge 22 may also be utilized in developing a temperature sensor. This may require calibrating the value of resistance at some reference temperature and then configuring the control system or the controlling unit based on the temperature behavior of temperature of the strain gauge 22 to determine the temperature affecting the strain gauge 22. Furthermore, this may require detecting when there is a considerable pressure applied to the strain gauge 22 in order to provide accurate temperature determination due to the fact that strain/pressure/force changes to resistance of the strain gauge 22.

According to an embodiment, a separate temperature measurement may be utilized in temperature compensation, such as measuring the ambient temperature and inputting the data to the controlling unit or a separate temperature compensation system.

In some substrates on which the strain gauge 22 has been printed on, the effect of temperature on the resistance of the strain gauge 22 is essentially linear at least in some temperature range. However, in some substrates the effect may also be non-linear. The controlling unit or the temperature compensation system, for example, comprising temperature measurement, microcontroller, and, optionally, an excitation voltage source, may be configured for providing suitable compensation voltage relative to the used substrate on which the strain gauge 22 is to be or has been provided on.

It is to be understood that the temperature compensation and utilizing the strain gauge as a heating element or a temperature sensor may also be utilized in embodiment illustrated in FIGS. 3-14.

Figure 3:
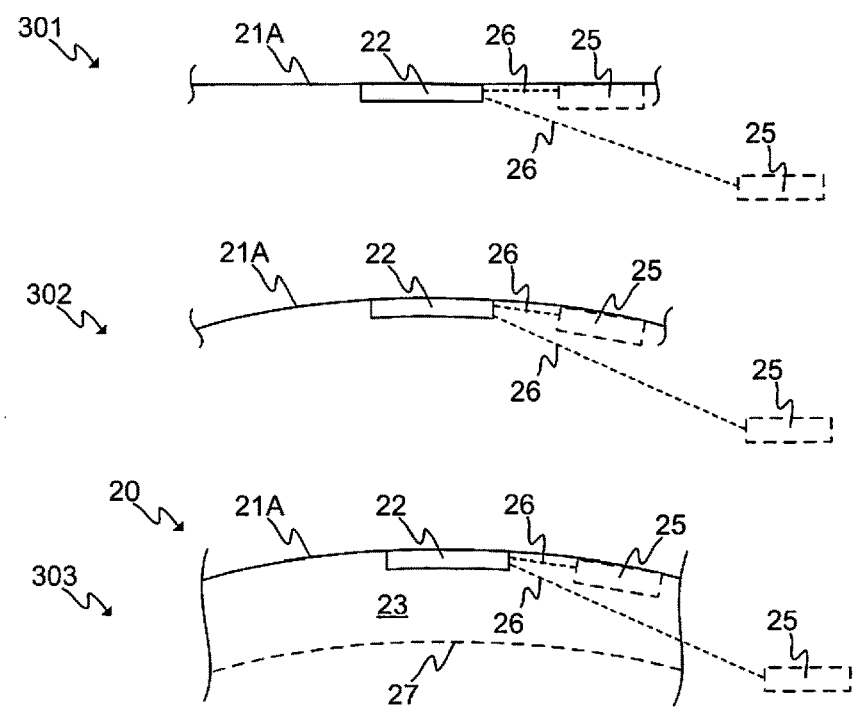
FIG. 3 illustrates schematically a strain gauge device according to an embodiment of the present invention.

FIG. 3 illustrates schematically a strain gauge device 20 according to an embodiment of the present invention. At 301, which is essentially similar with respect to 201 shown in FIG. 2, the strain gauge accommodated substrate 21A may further be formed, such as thermoformed or cold-formed, vacuum formed, pressure formed, or high pressure formed, for example, by utilizing a form press or air pressure, preferably, to have a 3D shape as shown at 302. At 303, it is illustrated that the strain gauge 22 of the strain gauge accommodated substrate 21A may be overmolded with or embedded into a molded material layer 23. This may be done by using a molding device, such as utilizing injection molding. Other edges 27 of the molded material layer 23 may be defined by the molding cavity of the molding device, or the structures of mold thereof. As can be seen, the strain gauge device 20 exhibits a three-dimensional shape due to the forming.

According to an embodiment of the present invention, the first 21A or the second 21B substrate may be, preferably thin, metal film or sheet. The strain gauge 22 may be printed on such a metal film or sheet and overmolded with molded material layer 23. However, an insulating layer may advantageously be provided, such printing a dielectric layer with dielectric ink, on the first substrate, and the strain gauge 22 may then be printed on said insulating layer. The strain gauge 22 may be used to monitor, sense or detect the pressure applied to the metal film or sheet wherein, for example, capacitive sensing device might not work properly due to the relatively high conductivity of the metal film or sheet. The metal film or sheet should, preferably, be such that it is configured to bend so that the strain gauge 22 bends as a response to the bending of the metal film or sheet. In some embodiments, the metal film or sheet may, thus, need to be configured to bend when a user applies force by his/her finger or arm, for instance. However, in some applications, the strain gauges 22 may be used to monitor deformation of the metal film or sheet which, in normal conditions, should not occur, and may such provide an indication of a damage object or device. According to one embodiment, the first substrate 21A is metal, such as a metal film or sheet, and the strain gauge 22 and, optionally, other electronic components are arranged to the second substrate 21B, for example, a substrate film for accommodating electronics.

According to an embodiment, the first substrate film 21A and/or further substrate films may comprise metal, such as being a, preferably thin, metal film or sheet, preferably having high resistivity, such as higher than or equal to 0.1 micro-ohm/m which facilitates operation of the strain gauge 22 comprising conductive ink.

According to an embodiment of the present invention, there may be graphics provided onto the first or the further substrate which may have high permittivity or conductivity, and thus the use of capacitive sensing device may be difficult. In these application, the use of strain gauge device 20 according to an embodiment of the present invention can be especially advantageous.

Figure 4A:
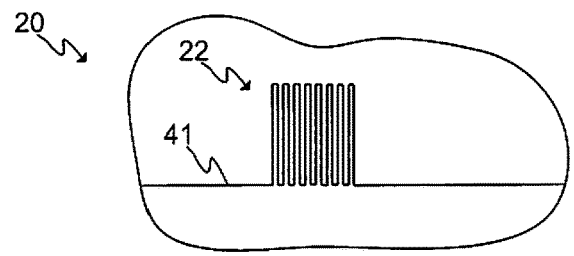
FIGS. 4A, 4B, 4C and 4D illustrate strain gauges according to various embodiments of the present invention.
Figure 4B:
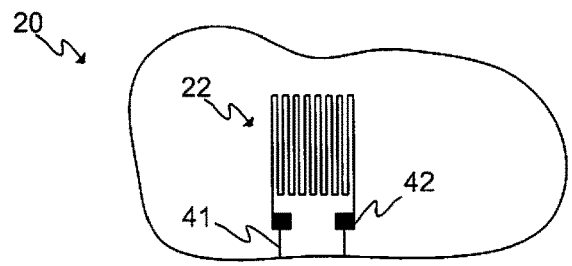
Figure 4C:
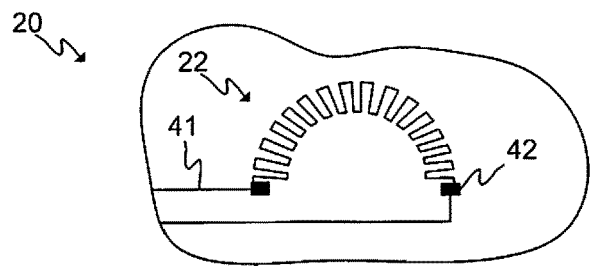
Figure 4D:
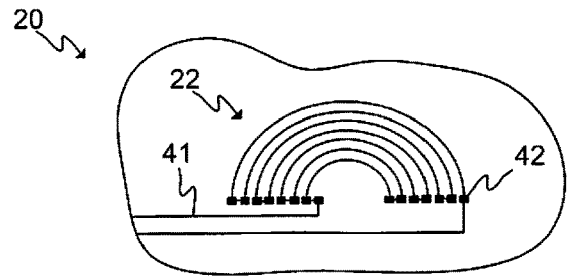

FIGS. 4A-4D illustrate schematically strain gauges 22 according to various embodiment of the present invention. As can be seen, the strain gauge 22 may be produced as having one of various shapes. Although only four examples have been illustrated in FIGS. 4A-4D, it is clear that the strain gauge 22 may exhibit some other shape than one illustrated in the figures in question. Terminals of the strain gauge 22 may, preferably, be connected to electrical conductors 41 which may also be printed, for instance. Furthermore, there may be contact pads 42 for connecting electrical conductors to the strain gauge 22, for example, by printing or by other means. FIGS. 4A and 4B illustrate rectangular-shaped strain gauges 22 and FIGS. 4C and 4D arc-shaped strain gauges 22. As can be seen, the arc-shaped strain gauges 22 are different with respect to each other in that the conductive strip of the gauge 22 in FIG. 4C resembles a zigzag pattern whereas in FIG. 4D the pattern comprises arcs and connective parts forming the gauge 22.

The geometry for the strain gauge device 20 may be chosen such that false detection of applied pressure may be minimized or at least reduced. The molded material layer 23 may be, for example, made of two different parts and/or materials, or having a spacer between two parts in order to isolated different parts of the device from each other, thus creating pressure sensing areas which may be monitored by different strain gauges 22 or sets of strain gauges 22.

Figure 5:
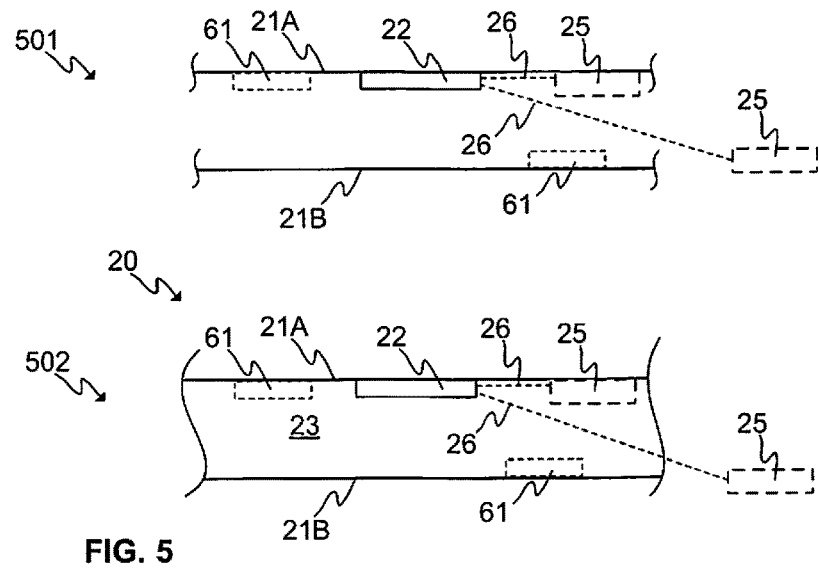
FIG. 5 illustrates schematically a strain gauge device according to an embodiment of the present invention.

FIG. 5 illustrates schematically a strain gauge device 20 according to an embodiment of the present invention. First, a first substrate 21A and a second substrate 21B, such as planar substrates, which may preferably be formable, for accommodating electronic components, may be obtained at 501. A strain gauge 22 may then be arranged on one of the substrates 21A, 21B. Next, at 502, it is illustrated that the strain gauge 22 of the strain gauge accommodated substrate, in this particular case the first substrate film 21A, may be overmolded with or embedded into a molded material layer 23 by molding the molded material layer 23 between the first 21A and second 21B substrates. This may be done by using a molding device, such as utilizing injection molding. It should be noted that the strain gauge device 20 may as well be arranged alternatively or in addition (a device 20 comprising at least two strain gauges 22) on the second substrate 21B.

Furthermore, at least one of the first 21A and second 21B substrates may comprise other electronic components 61, such as conductors, electronics, traces, pads, patches, etc. According to some embodiments, the controlling unit 25, such as a microcontroller 25 may be arranged to different substrate with respect to the strain gauge 22. The electrical connection 26 may then extend through the molded material layer 23.

In various embodiments of the present invention, the first substrate 21A may be arranged to outer edge of the device 20 which means that the pressure to be sensed by the device 20 is designed to be applied or expected to be directed from that side of the device 20, that is, from a first side. As temperature also typically affects the resistivity of material, the strain gauge 22 may also be affected by changes in temperature as described hereinearlier. Thus, by arranging the strain gauge 22 on the second substrate 21B, that is, insulated from the first side of the device 20 by the molded material layer 23, the effect of temperature on the first side on the operation of the strain gauge 22 may be minimized or at least reduced. The molded material layer 23 thus insulated the strain gauge 22 from the ambient temperature or temperature of any object in contact or in close proximity with respect to the device 20, especially, on the first side.

Figure 6:
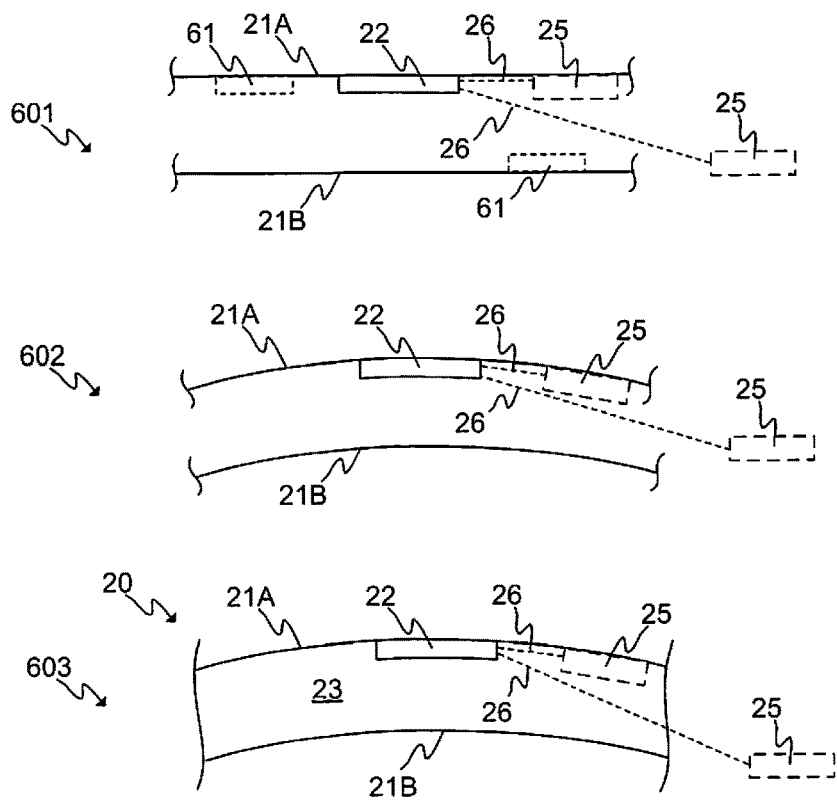
FIG. 6 illustrates schematically a strain gauge device according to an embodiment of the present invention.

FIG. 6 illustrates schematically a strain gauge device 20 according to an embodiment of the present invention. Step 601 is essentially similar with respect to the step 501 shown in FIG. 5. At 602, at least the strain gauge accommodated substrate may be formed, such as thermoformed or cold-formed, vacuum formed, pressure formed, or high pressure formed, for example, by utilizing a form press or air pressure, preferably, to have a three-dimensional shape. Preferably, both the first 21A and the second 21B substrates may be formed at 602. At 603, it is illustrated that the strain gauge 22 of the strain gauge accommodated substrate may be overmolded with or embedded into a molded material layer 23 by molding the molded material layer between the first 21A and second 21B substrates. This may be done by using a molding device, such as utilizing injection molding. As can be seen, the strain gauge device 20 exhibits a three-dimensional shape due to the forming. The controlling unit 25, such as a microcontroller 25 may be arranged to different substrate with respect to the strain gauge 22. The electrical connection 26 may then extend through the molded material layer 23.

Having regard to the material selections, the second substrate 21B may substantially consist of or comprise at least one material selected from the group consisting of: polymer, thermoplastic material, PMMA, PC, polyimide, MS resin, glass, PET, carbon fiber, organic material, biomaterial, leather, wood, textile, fabric, metal, and alike. The material(s) used may be at least locally electrically conductive or more typically, insulating. Yet, the optical properties may vary depending on the embodiment having regard to opacity/transparency, transmittance, etc.

FIG. 7 illustrates schematically a strain gauge device 20 according to an embodiment of the present invention. The strain gauge 22 has been provided, such as printed, on the second substrate 21B, although, could be as well be provided on the first substrate 21A. The device 20 may further comprise a capacitive sensing device 70 comprising a first capacitive sensing element 71 and a second capacitive sensing element 72. The capacitive sensing elements 71, 72 may be, for example, planar conductive elements or "patches". According to the embodiment shown in FIG. 7, the first capacitive sensing elements 71, such as the Rx electrode, may be printed or arranged as a ready-made component on the first substrate 21A. The second capacitive sensing element 72, such as Tx electrode, may be printed or arranged as a ready-made component on the second substrate 21B. The strain gauge 22 may be, for example, arranged parallel to the second capacitive sensing element 72 or surrounded by the second capacitive sensing element 72 if said element 72 has a closed shape, such as a rectangle or a circle. According to an embodiment of the present invention, the printed strain gauge 22 may be utilized as an electrode of the capacitive sensing device. According to further embodiments, the capacitive sensing elements 71, 72 may be arranged to the same substrate or to same plane in parallel with respect to the strain gauge 22 or gauges 22, that is, to a different position, or to a different substrate and to a different position or aligned with the strain gauge 22. In case of utilizing the strain gauge 22 as a part of a push button, the capacitive sensing device 70, or at least a sensing element 71, 72 thereof may be arranged to the same button, even such that the strain gauge 22 acts as one of the capacitive sensing elements 71, 72. The strain gauge device 20 shown in FIG. 7, or a similar kind of device 20, may be used as a sensing device such that the information from the capacitive sensing device 70 and the strain gauge device 20 may be used to detect the applied pressure or "touch". According to one example, the measurement of the capacitive sensing device 70 may be utilized as a first trigger or to provide a first trigger signal, for example, when exceeding a first threshold in a measurement or pressure sensing system. The system can be configured to start measuring the output of the strain gauge 22 only after receiving the first trigger, thus the strain gauge 22 can be used to verify the measurement of the capacitive sensing device 70. Thus, erroneous measurement by the capacitive sensing device 70 can advantageously avoided by the confirmation of the sensing by the strain gauge 20. This is also advantageous because the strain gauge 22 can be kept passive and not consuming electrical power as long as there is no first trigger sensed by the capacitive sensing device 70. According to another example, the strain gauge 22 can be utilized in the measurement or sensing system to sensed or measure the first trigger, after which the capacitive sensing device 70 may be used to verify or confirm the measurement result of the strain gauge 22. The intended action, for example, due to a push of a certain button or at a certain position, may be performed only after both the capacitive sensing device 70 and the strain gauge 22 indicate the presence of the push, that is, the sufficient pressure being applied.

According to an embodiment of the present invention, the capacitive sensing device 70 may be configured to determine the location of user's hand or finger, or the object used for causing the capacitive sensing device 70 to react. The determined location may then be utilized to activate the strain gauge 22, that is, the measuring of the resistance of the strain gauge 22 based on the determined location by the capacitive sensing device 70, and, therefore, the verify the position of said hand or object, and, optionally, to determine that a command has been given by the user. The system may then be configured to carry out actions related to such command. If, for example, there are a plurality of strain gauge devices 20 arranged into the target device or system, only one or a portion of them can be activated based on the measurement of the capacitive sensing device 70. This has the advantage that the rest, or not-activated strain gauges 22, do not consume electrical power, for instance. According to another embodiment, one or several strain gauges 22 may be arranged and configured to determine the location of, for example, user's finger on the user interface and then the capacitive sensing device 70 may be used for verifying the position and/or to receive the command from the user, for example, by a pushing motion.

Examples of the operation of a strain gauge device 20 according to an embodiment of the present invention utilizing a strain gauge 22 and a capacitive sensing device 70 are illustrated in FIGS. 8A and 8B.

In FIG. 8A, at step 80A, referring to a start-up phase, the strain gauge device 20 comprising at least one strain gauge or several strain gauges 22 and one or several capacitive sensing devices 70 may be obtained and configured for use. At step 81A, the capacitive sensing device 70 may be controlled, for example, by a controlling unit 25 in connection with the strain gauge device 20, to sense if the capacitance of the capacitive sensing device or devices 70 changes and, if so, to determine the characteristics of the change of the capacitance. The characteristics of the capacitance change may then be used to determine the location or the position of the object, such as user's finger, at step 82A. The location or the position may be determined by known methods utilized in connection with capacitive sensors. Then at step 83A, a strain gauge or strain gauges 22 at said determined location or position may be activated, for example, by the controlling unit 25 and/or an excitation voltage source, for measuring if the pressure is being sensed, that is, if the resistance of the strain gauge or gauges 22 has changed from their base value or if they will change during the time period when the gauge or gauges 22 are being activated. If the pressure is not sensed at step 84A, the method may return to step 81A. If, on the other hand, pressure is being sensed at step 84A, the measurement of the strain gauge or gauges 22 may be, for example, utilized to confirm the location or position determined by the capacitive sensing device 70. Thus, the capacitive sensing device 70 may be used to provide a first trigger signal and the strain gauge 22 may be activated in response to the first trigger signal, for example, to confirm the determined location by the capacitive sensing device 70 and, optionally, at step 85A, the sensed pressure at the location or position may be configured to trigger a functionality or an action which may be, for example, any functionality configured for the particular device or system. Thus, the strain gauge device 20 such as explained herein may be used as a push button or a slider, for instance, or as any controlling device of the system in question suitable for triggering an action. Step 89A refers to the end of the method flow. The method of FIG. 8A may be performed once, continuously or intermittently, depending on the desired operation and use of the device 20.

FIG. 8B illustrates another example of the operation of the strain gauge device 20. Step 80B refers to a start-up phase in which the strain gauge device 20 comprising at least one strain gauge or several strain gauges 22 and one or several capacitive sensing devices 70 may be obtained and configured for use. At step 81B, the strain gauge 22 or, preferably, gauges 22 are being activated, for example, by a controlling unit 25, and their resistance monitored. Step 82B may refer to comparing the resistance value or the change thereof to a base value or a threshold value, for instance. If the pressure is not sensed, the method returns to step 81B. If, on the other hand, pressure is sensed, then at step 83B, the capacitive sensing device or devices 70 at the respective location or position or area may be activated, and its or their capacitance may be monitored. At step 84B, the position of the object causing the pressure, for example, user's finger, may be calculated based on the monitored capacitance. If the calculated position corresponds to the position of the strain gauge or gauges 22 which have sensed the pressure, a functionality may be triggered at step 85B similarly as described with respect to FIG. 8A. Step 89B refers to the end of the method flow. The method of FIG. 8B may be performed once, continuously or intermittently, depending on the desired operation and use of the device 20.

According to still another embodiment of the present invention, the strain gauge 22 and the capacitive sensing device 70 of the strain gauge device 20 may be used or configured for use in parallel or simultaneously to monitor the resistance or the change thereof, and the capacitance, respectively. This may entail having both the strain gauge or gauges 22 and the capacitive sensing device or devices 70 activated simultaneously and monitoring their related measurement parameters (resistance and capacitance, for instance). The measurement may then be utilized for cross-checking or, for example, utilizing one of the measurements for monitoring environmental conditions and the other for receiving pressure, that is, for example, commands from the user. The strain gauge 22 may be, for example, used for monitoring temperature or vibrations, for instance, while the capacitive sensing device 70 may be used as a push button or a switch.

The combination of strain gauge device 20 and the capacitive sensing device 70 may be configured to be operated by the controlling unit 25 or units 25. In case of a single controlling unit 25, the operation of said devices 20, 70 may be divided based on time-division or frequency-division methods.

By manufacturing the structure comprising a strain gauge 22 and capacitive sensing device 70 as described hereinabove by the method described herein (particularly with respect to FIG. 1), provides advantage that the structure may be manufactured in one process, thus yielding an effective way to produce it and to result in an integrated and durable structure comprising a pressure sensing device for utilizing as a sensor, push button or a switch. Furthermore, the capacitive sensing device 70 and the strain gauge device 20 may be configured verify the measurements of each other, for example, by using a controlling unit 25 comprising at least processor and other known, essential components.

Figure 9A:
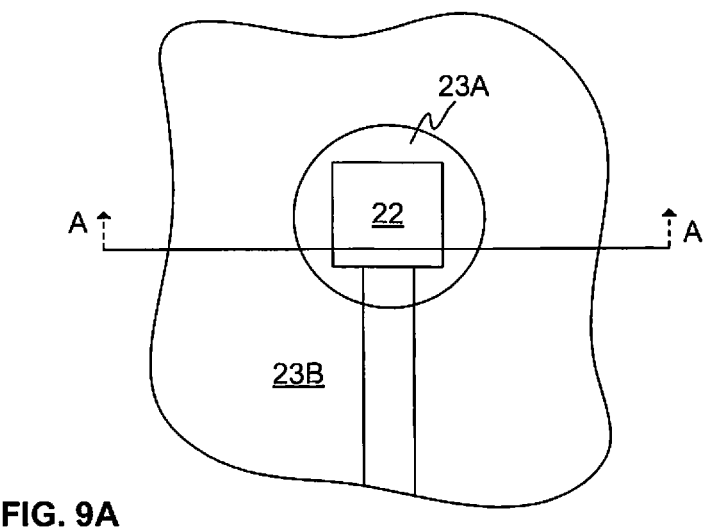
FIGS. 9A, 9B and 9C illustrate schematically strain gauge devices according to some embodiments of the present invention.
Figure 9B:
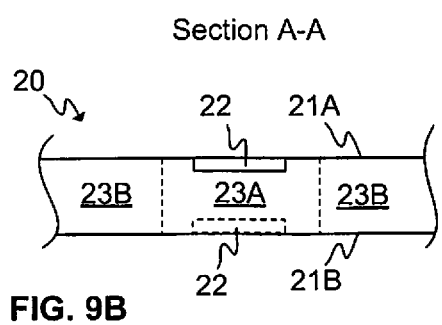
Figure 9C:
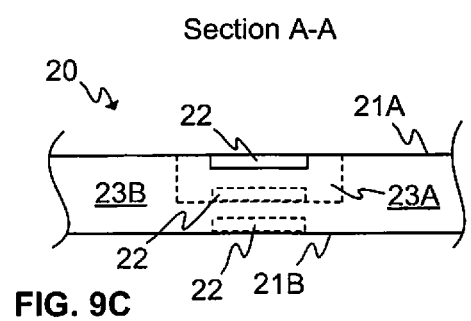

FIGS. 9A, 9B and 9C illustrate schematically strain gauge devices 20 according to an embodiment of the present invention. In FIG. 9A, the molded material layer 23 has been produced by using two different materials. A first molded material 23A has been used in the part of the device 20 in which the strain gauge 22 or gauges 22 reside. The strain gauge 22 may be overmolded or embedded into the first molded material 23A or there may other material layer provided between the strain gauge 22 and the first molded material 23A. Other parts may have been molded with at least a second molded material 23B. Said other material may be, for example, a relatively thin layer of second molded material 23B. The first molded material 23A may preferably be softer than the second molded material 23B in order to make the strain gauge device 20 more sensitive to pressure applied to the device at the strain gauge 22 while the portions of the device 20 having the second molded material 23B may be less sensitive. There may be, for example, polyurethane used as the softer first material 23A whereas the harder second material 23B may be harder plastic. Furthermore, recesses or protrusion may be provided to the portion in which the strain gauge 22 resides.

FIG. 9B shows the device 20 with a cross-sectional view about section A-A. The strain gauge 22 or gauges 22 may be arranged, for example printed, on either one or both of the first 21A and second 21B substrates. The device 20 is shown to exhibit planar or two-dimensional-like shape, however, it may also be formed to have a 3D shape. By arranging the strain gauge 22 on the substrate which is to provide the "inner" surface, that is, the substrate on the opposite side of the molded material layers 23A and 23B being the substrate to which the pressure to be measured is designed to be applied, the effect of local temperature change, for example, due to person's finger, on the measurement of the strain gauge 22 can be minimized or at least reduced, because the molded material layers 23A and 23B insulates the strain gauge 22 from the local temperature variation, whether increase or decrease in the temperature. The pressure is still transmitted efficiently through the molded material layers 23A and 23B and measurable with the strain gauge 22. In FIG. 9B, the first substrate 21A may be thought to reside on the outer surface of the device 20, for instance, and, thus, designed to receive the pressure to be measured. The second substrate 21B may in this case then thought to reside on the inner side of the device 20. As can be seen, the first molded material layer 23A may, preferably, be molded at the corresponding part of the device 20 as the strain gauge 22. The first molded material layer 23A extends substantially from the first substrate 21A through the device 20.

Figure 10A:
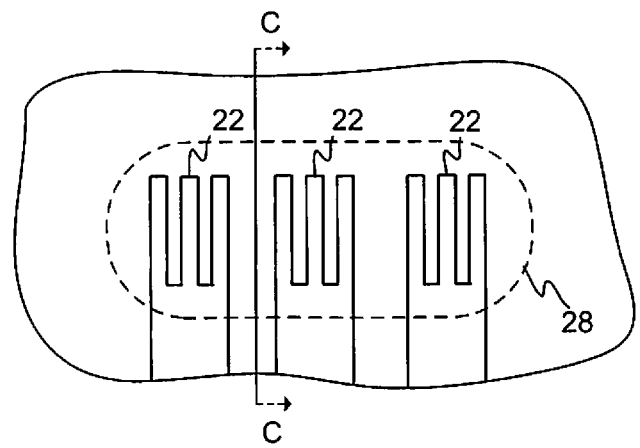
FIGS. 10A, 10B and 10C illustrate schematically strain gauge devices according to some embodiments of the present invention.
Figure 10B:
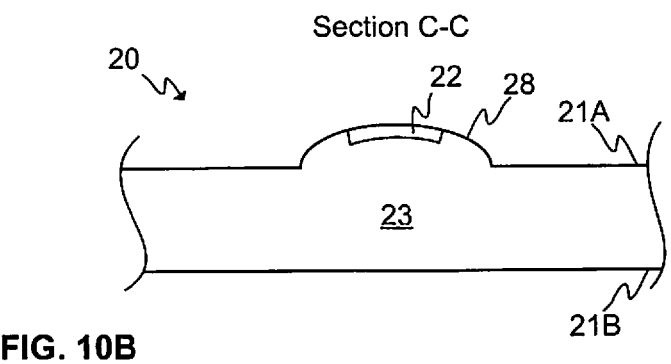
Figure 10C:
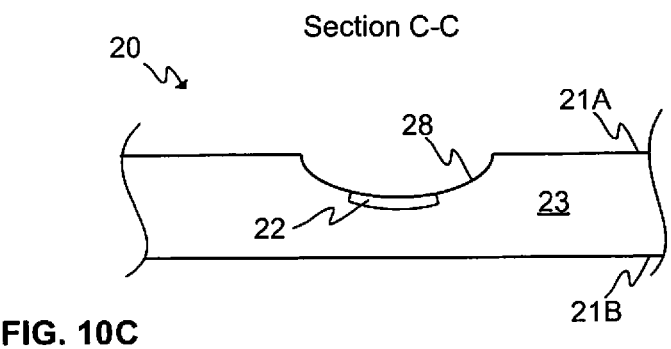

FIG. 9C shows another embodiment of the device 20 with a cross-sectional view about section A-A. In this case, as can be seen in FIG. 9C, the first molded material layer 23A does not extend through the device 20, but rather only a portion of the thickness of the device 20. The strain gauge 22 may be printed to the first substrate 21A or to the second substrate 21B, or, if for example, the second molded material layer 23B has been molded in a first phase, then the strain gauge 22 may be arranged in a second phase on the bottom of the recess or hole into which the first molded material layer 23A is to be molded. Alternatively or in addition, the strain gauge device 20 illustrated in FIG. 9C may be such that the first molded material layer 23A is omitted, that is, the strain gauge 22 is arranged, for example, on the second substrate 21B and the molded material layer 23, 23B may be thinner at least at the corresponding positions of the device 20 with respect to the strain gauge or gauges 22, that is, being at least locally less thick (shorter in z-direction in case of a planar substrate). FIGS. 10A to 10C illustrate schematically strain gauge devices 20 according to some embodiments of the present invention from above or below (FIG. 10A) and as cross-sectional side views about section C-C (FIGS. 10B and 10C). The device 20 may comprise one or, preferably, a plurality of strain gauges 22 being arranged to a ridge 28 or protrusion 28, or to a recess (groove) 28 or hole 28. In case of having a plurality of strain gauges 22, the strain gauge device 20 may configured to operate as a slider, for example, as a touch slider. Although the plurality of strain gauges 22 may be arranged on the surface of the planar substrate and the device 20 configured to operate as a slider, FIG. 10A illustrates the strain gauges 22 being arranged on a ridge 28 or a recess 28. By having the ridge 28 or the recess 28 the force causing the strain is better transmitted to the strain gauge or gauges 22. FIG. 10B illustrates an embodiment of the device 20 comprising strain gauge or gauges 22 in a ridge 28 or a protrusion 28. FIG. 10C illustrates an embodiment of the device 20 comprising strain gauge or gauges 22 in a recess 28, a hole 28 or a groove 28.

Figure 11A:
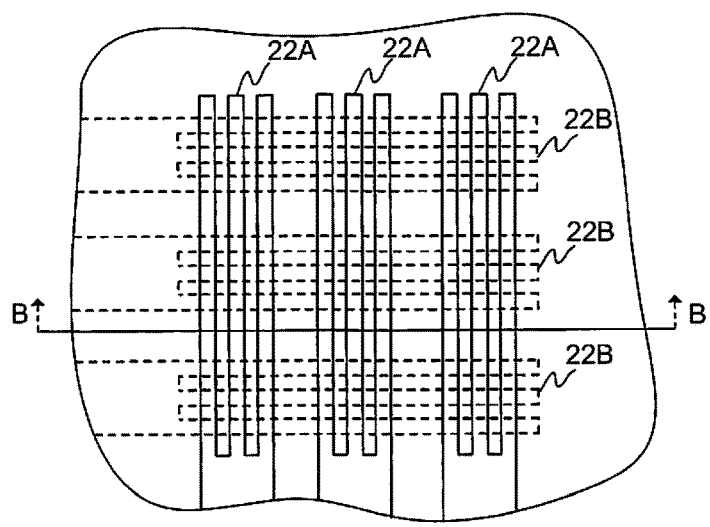
FIGS. 11A and 11B illustrate schematically a strain gauge device according to an embodiment of the present invention.
Figure 11B:
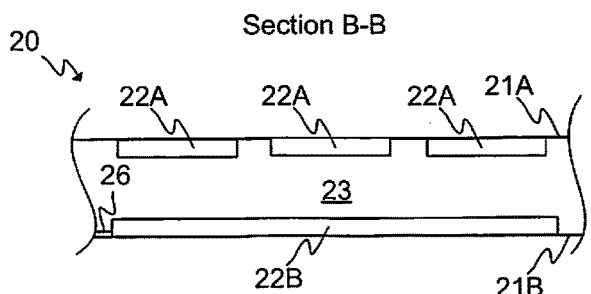

FIGS. 11A and 11B illustrate schematically an embodiment of the present invention. FIG. 11A illustrates a strain gauge device 20 comprising a plurality of strain gauges 22 arranged on the substrates 21A, 21B. According to the embodiment of FIG. 11A, there are three parallel strain gauges 22 arranged on the first substrate 21, that is the first strain gauges 22A, preferably, on the inner surface with respect to the molded material later 23 thereof and thus embedded with molded material layer 23. Furthermore, there may be another three parallel strain gauges 22B arranged on the second substrate 21B, that is, the second strain gauges 22B, preferably, on the inner surface thereof and thus embedded with molded material layer 23. The strain gauges 22A, 22B of the first 21 and second 21B substrates, respectively, may overlap such that portion of each strain gauge 22 may reside at a corresponding part of the device 20 with respect to a strain gauge 22 or gauges 22 on the opposite substrate, that is, a first strain gauge 22A with respect to a second strain gauge 22B. At least one first strain gauge 22A may be at least partly at a corresponding position with respect to at least one second strain gauge 22B. According to an embodiment, the strain gauges 22B on the second substrate 21B may be arranged perpendicularly with respect to the strain gauges 22A on the first substrate 21A and to overlap as described hereinabove. According to an embodiment, a touch screen may be obtained by arranging the strain gauges 22A, 22B overlapping in a manner as in FIG. 11A, especially, when utilizing transparent ink for printing.

The configuration shown in FIG. 11A may be used to locate the area at which the pressure is being applied to. This may be implemented by measuring the output of all six strain gauges 22A, 22B. The six strain gauges 22A, 22B essentially define or form nine areas or points, that is, a matrix which can be used to detect the pressure point. For example, if pressure is applied to top right corner of the surface of the device 20 comprising the strain gauges 22, the resistance of the strain gauge 22A on the right on the first substrate 21A changes more than the resistance of the other two strain gauges 22 on the first substrate 21A. Furthermore, as there are strain gauges 22B also on the second substrate 21B, the resistance of the topmost strain gauge 22B on the second substrate 21B changes more than the resistance of the other two strain gauges 22B on the second substrate 21B. Thus, the pressure point can be located to be on the top right corner of the device 20. It should be noted that the size of the matrix comprising such measuring points defined by the strain gauges 22A, 22B may have any size, for example, two-by-two, three-by-three as shown in FIG. 11A, or three-by-four, or four-by-four, etc. FIG. 11B shows the device 20 of FIG. 11A with a cross-sectional view about section B-B.

According to an embodiment, the first 22A and second 22B strain gauges may be arranged essentially on the surface of the same substrate, that is, the first 21A or the second 21B. The first strain gauges 22A may be printed on the first substrate 21A and then an electrically insulating material, such as a dielectric layer, may be printed over the first strain gauges 22A and then the second strain gauges 22B may be printed over the dielectric layer whereby the dielectric layer separates the first 22A and second 22B strain gauges electrically from each other. The advantage of having a plurality of strain gauges 22 at the same position, on top of each other, is that the measurements of each gauge 22 may be used for cross-checking or verification of the measurements of the gauges 22. Furthermore, this allows self-correction for temperature or other stress creep or offset. According to a further embodiment, the strain gauges 22 arranged at the same position may be such as they are directionally sensitive. This means that one gauge 22 may be more sensitive to x-direction and another to y-direction of the x-y plane. There may also be further directionally sensitive gauges 22 arranged thereto.

According to some embodiments, the conductive ink used in printing the strain gauges 22; 22A, 22B may be transparent which makes it possible to produce a touch screen wherein the strain gauges 22; 22A, 22B are used to sense the presence and location of touch. However, according to another embodiment, the ink used may be opaque.

Figure 12:
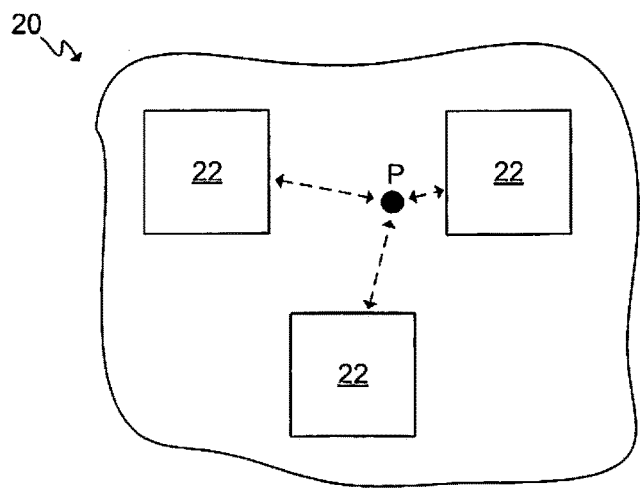
FIG. 12 schematically a strain gauge device according to an embodiment of the present invention.

FIG. 12 illustrates still another embodiment of the present invention. There may be at least three strain gauges 22 printed on a substrate 21A, 21B substantially on a plane, wherein said three strain gauges 22 essentially define three vertices of an imaginary triangle. Configuration such as this may then be used in triangulation process when locating the point at which the pressure is being applied. The pressure point P in FIG. 12 is in this case on the triangular area defined by strain gauges 22. The applied pressure as referred herein refers to deviation of pressure at a certain point or area relative to the pressure of the surrounding areas. This may be, for example, a pressure increase on a small area due to a pushing motion by user's finger. By comparing the changes of resistances of the three strain gauges 22 with respect to each other, the distance of the pressure point P from each of the strain gauge 22 may be determined. This may require calibrating the base values of the strain gauges 22 with respect to each, if the strain gauges, or at least the resistance values or the change thereof in response to a strain/pressure/force, are not identical. As is apparent to be skilled person the number of strain gauges 22 may be higher than three.

Injection molding may be applied in the manufacturing process. The substrate and, optionally, the protective layer(s) (if already present) may be used as an insert in the mold structure or mold. Optionally, multi-shot or multi-component molding is applied to provide e.g. multiple materials to the multilayer structure. Plastic layer may be at least partially optically transparent and/or comprise recesses or through-holes to provide visual path to the underlying electronics that may include optoelectronic components (light-emitting diodes (LEDs), photosensitive detectors) or e.g. a display such as OLED (organic LED) display. The plastic layer may additionally or alternatively contain opaque, e.g. colored or graphics-containing, or translucent portions. The plastic player may be further provided with surface relief forms or other features for various purposes, such as for optical use (e.g. light incoupling, outcoupling, scattering, or reflection).

According to some embodiments, an additional layer may also be, for example, laminated, such as by using adhesives, onto the molded material layer 23 or onto at least one of the substrates 21A, 21B after the molding, depending on the particular embodiment and/or the intended use of the resulting device 20.

A person skilled in the art shall know beforehand or determine by field testing the optimum process parameters in the light of used materials, dimensions and components. Few merely exemplary guidelines can be given for general guidance. When the substrate(s) is/are PET and the plastics to be overmolded thereon is PC, the temperature of the melted PC may be between 280 and 320 degrees Celsius and applicable mold temperature may range from about 20 to 95 degrees Celsius, i.e. it may be about 80 degrees Celsius, for example. The used substrate(s) 21A, 21B, such as film(s), and the process parameters shall be selected such that the substrate(s) remains substantially solid during the process.

Potentially preinstalled electronics have been preferably attached to the substrate such that they remain static during the molding. Optionally, roll-to-roll technique may be utilized during the execution of the manufacturing method at least for selected phases, such as the provision of the substrate with traces/components or the integration of layers together. Application of roll to roll requires some flexibility from the used material layers. Accordingly, the end product (the obtained device) may be flexible. However, the present invention is in practice applicable also to scenarios with more rigid material sheets or generally, pieces of desired material.

The target electronic product or device 20 incorporating the strain gauge 22 or gauges 22 may include e.g. a consumer electronics device, industrial electronics, automation equipment, machinery, automotive product, safety or protection device, computer, tablet, phablet, mobile terminal such as cell phone, alarming device, wearable electronics/product (garment, headwear, footwear, etc.), sensor device, measurement device, display device, game controller or console, lighting device, multimedia or audio player, audiovisual (AV) device, sports gear, communication device, transport or carrying equipment, battery, optical device, solar panel or solar energy device, transmitter, receiver, wirelessly controlled device, or controller device.

According to one example case, the strain gauge device 20 according to an embodiment of the present invention may be used for detecting when user's hands are on the steering wheel of a vehicle, that is, for hands-on-off detection and/or in a hands-on-off detection sensor. This may be implemented by a device 20 comprising the strain gauge 22 which may be utilized to detect the pressure applied to the steering wheel by user's hands.

According to another example, when a capacitive sensing device 70, such as a capacitive sensor, is arranged to the device 20 in addition to the strain gauge 22, the strain gauge 22 may be used as a second trigger or to provide or generate a second triggering signal, for example, if a second threshold related to the measured resistance value is exceeded, in order to verify that the capacitive sensing device 70 indicates correctly the presence of hands on the steering wheel. Strain gauges 22 according to various embodiments of the present invention may advantageously be used in application where capacitive sensing device 70 are prone to error due to interferences from electrical equipment or the like or to erroneous detection of user's hands nearby or by liquid drops or dirt, for instance. In automotive industry, the reliability related to the operation of the sensors is an important safety issue.

The strain gauge device 20 may advantageously be used as a sensing device which senses first that pressure is being applied to the device and/or secondly that depending on the magnitude of the force applied, different actions may be selected to be performed, for example, in case of a touch screen or a control equipment, such as a steering wheel or any user interface. The strain gauge device 20 according to the embodiments of the present invention is insensitive to the fact that whether user's hands are dry or wet because the device 20 operates, at least partially, based on the force or pressure generated by the user or any object and being transmitted to the strain gauge 22 and sensed as strain (through measuring of the resistance of the gauge 22 or the change in the value of resistance).

Figure 13:
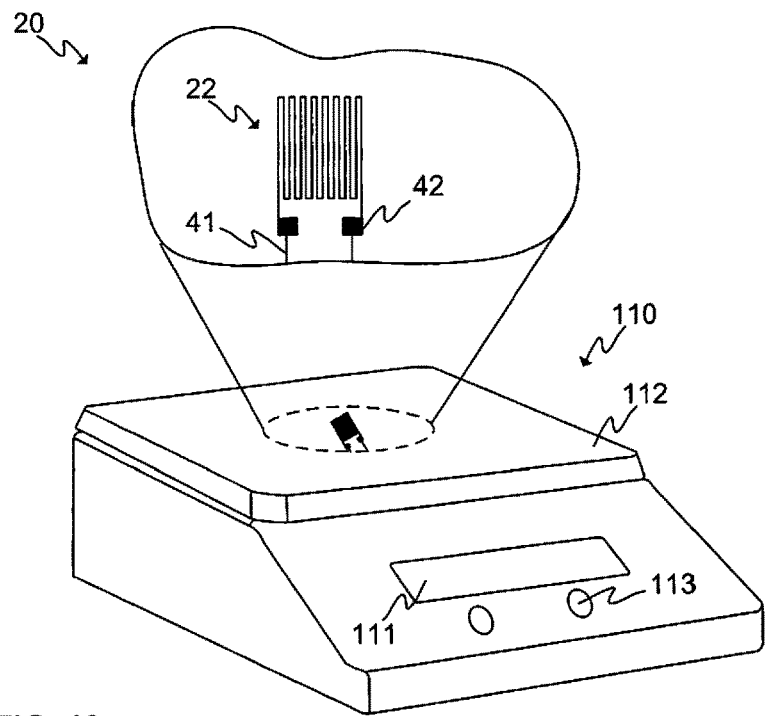
FIG. 13 illustrates schematically a weighing device according to an embodiment of the present invention.

Embodiments of the strain gauge device 20 may be used for weighing in various applications. The strain gauge device 20 may advantageously be arranged to a weighing device 110 such as shown in FIG. 13. The strain gauge 22 and the measurement system in connection to the strain gauge device 20 may be configured to provide a measurement signal relative to the weight (or the mass causing force due to gravity) of an object placed on the weighing device 110. The strain gauge device 20 may be arranged to surface 112 arranged for placing the object to be weighed or there can be an additional surface or structure on which the object is intended to be placed and then the pressure (or force) is transmitted to the strain gauge 22. The strain gauge device 20 used for weighing, or weighing devices 110, may be manufactured, at least partly, by utilizing an embodiment of the manufacturing method described hereinearlier. The weighing device 110 may, preferably, comprise a digital screen 111 for presenting the weighing result for the user. The screen 111 may preferably be connected to a controlling unit 25 which comprises at least a processor and means for determining changes in the resistance value of the strain gauge 22 for calculating the weight (or the mass) of the object placed on the weighing device 110. There may also be a user interface, such as push buttons 113, comprised in the weighing device 110.

Figure 14:
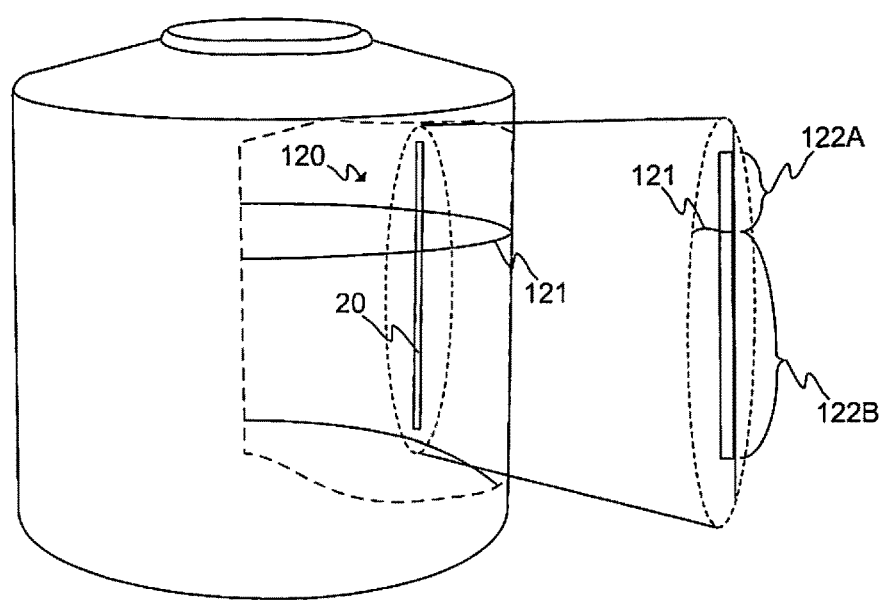
FIG. 14 illustrates schematically a level indicator device according to an embodiment of the present invention.

Embodiments of the strain gauge device 20 may be used for level, such as liquid level 121, indication in various applications. The strain gauge device 20 may advantageously be arranged to a level, for example liquid level, indicator device 120, such as in a form of a strip comprising a one or a plurality of strain gauges 22 or strain gauge devices 20. The strain gauge 22 and the measurement system, such as a controlling unit 25, in connection to the strain gauge(s) 22 may be configured to provide a measurement signal relative to the level of the quantity, such as the liquid level 121, to be measured. There may be one or several strain gauge devices 20 arranged, for example, to an inner side wall of a container containing the liquid such as shown in FIG. 12. According to an embodiment, there may be several strain gauges 22 of the strain gauge device 20 may be arranged in a strip such as illustrated in FIG. 14. The strip may be arranged, for example, to an inner side wall of the container and thus the strip may be utilized to indicated to level of liquid because the liquid causes a static force to the strain gauge 22 below the surface 122B of the liquid whereas there is air or atmospheric pressure affecting the strain gauges 22 above the surface 122A. It should be noted that the strain gauge device 20 may also be used as a level indicator (device) other than liquids, for example, to sand or other such granular material, for instance. The strain gauge device 20 used for level indication, or in level indicators, may be manufactured by utilizing an embodiment of the manufacturing method described hereinearlier.

The strain gauge device 20 according to various embodiments of the present invention may be utilized in various applications, some of them presented hereinbefore. However, in general, strain gauge or gauges 22 according to the present invention may be provided on a variety of different substrates or surfaces by printing, and then utilized in any suitable device or system. The substrates may be rigid or formable or flexible. Furthermore, the substrates may be planar or exhibit significant thickness. In addition to what has been presented hereinbefore, the strain gauge devices 20 according to various embodiments of the present invention may be utilized, for example, in vehicles, such as in car seats (detecting if someone is sitting on the seat and/or for heating), in a turn signal switch, in a gearstick, or in any switches used to control devices in the vehicle, such as windows or lighting, etc. Furthermore, it is to be understood that the strain gauge device 20 according to embodiments of the present invention may be used in other fields than vehicles, such as described with respect to FIGS. 13 and 14. In general, the strain gauge device 20 may be used as a sensor for monitoring parameters and/or as a switch for operating an actuator in any suitable system, for instance.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. A method for manufacturing a strain gauge device, the method comprising:
    obtaining a first substrate including a first formable substrate film for accommodating electronic components,
    printing by a printed electronics method a strain gauge on the first substrate, and
    injection molding a molded material layer over the strain gauge, thereby embedding the strain gauge in the molded material layer.

2. The method according to claim 1, further comprising forming, by at least one of thermoforming, cold-forming, vacuum forming, pressure forming, or high pressure forming, the first substrate comprising the printed strain gauge.

3. The method according to claim 1, comprising obtaining a second formable substrate film, wherein the molding comprises molding the molded material layer between the first and second formable substrate films.

4. The method according to claim 1, wherein the strain gauge is a first strain gauge, the method comprising:
    printing at least one second strain gauge on a second substrate at least partly at a corresponding position with respect to the first strain gauge.

5. The method according to claim 1, comprising:
    arranging a controlling unit for controlling operation of the strain gauge between the first substrate and a second substrate, and
    arranging an electrical connection between the controlling unit and the strain gauge utilizing a printed electronics method,
    wherein the molding comprises molding the molded material layer to embed the controlling unit.

6. The method according to claim 1, comprising arranging capacitive sensing elements on the first or a second substrate.

7. The method according to claim 1, wherein the first substrate comprises one of the following: plastics, polymer, polycarbonate, polycarbonate-acrylonitrile butadiene styrene, poly(methyl methacrylate), polyimide, copolymer of methyl methacrylate and styrene monomer (MS resin), polyethylene terephthalate, wood, leather or fabric.

8. The method according to claim 1, wherein the first substrate comprises metal having a resistivity higher than or equal to 0.1 micro-ohm/m, and the method further comprises providing an insulating layer on the first substrate, and wherein the strain gauge is printed on said insulating layer.

9. A strain gauge device comprising:
    a printed strain gauge on a first formable substrate film, the strain gauge being embedded in an injection molded material layer, wherein the first formable substrate film includes at least one of the following: plastics, polymer, polycarbonate, polycarbonate-acrylonitrile butadiene styrene, poly(methyl methacrylate), polyimide, copolymer of methyl methacrylate and styrene monomer (MS resin), polyethylene terephthalate, wood, leather, or fabric.

10. The strain gauge device according to claim 9, comprising at least three printed strain gauges and wherein the device is configured for positioning a pressure applied to the first formable substrate film based on the at least three printed strain gauges by triangulation.

11. The strain gauge device according to claim 9, comprising a second substrate, wherein the molded material layer embedding the strain gauge is arranged between the first formable substrate film and the second substrate.

12. The strain gauge device according to claim 9, comprising a controlling unit on the first formable substrate film and arranged in electrical connection with the strain gauge.

13. The strain gauge device according to claim 9, wherein the first formable substrate film comprising the strain gauge has been formed to a three-dimensional shape.

14. The strain gauge device according to claim 9, wherein the strain gauge is a first strain gauge of the first formable substrate film, and the device comprises at least one second strain gauge printed on a second substrate at least partly at a corresponding position with respect the first strain gauge.

15. The strain gauge device according to claim 9, wherein the strain gauge is configured for use as a heating element.

16. The strain gauge device according to claim 9, wherein the device further comprises a capacitive sensing device.

17. The strain gauge device according to claim 16, wherein the capacitive sensing device is configured to provide a first trigger signal, and the resistance of the strain gauge is configured to be monitored in response to the first trigger signal, or
    the resistance of the strain gauge is configured to be monitored and to provide a first trigger signal, and the capacitive sensing device is configured to be monitored in response to the first trigger signal.

18. A hands-on-off detection sensor comprising the strain gauge device according to claim 9.

19. A steering wheel comprising the hands-on-off detection sensor according to claim 18.

20. A method for using the strain gauge device according to claim 9 comprising providing hands-on-off detection.

21. A weighing device comprising the strain gauge device according to claim 9.

22. A method for using the strain gauge device according to claim 9 comprising utilizing the strain gauge device for weighing.

23. A level indicator device comprising the strain gauge device according to claim 9.

24. The use of the strain gauge device according to claim 9 for liquid level indication.

25. The method according to claim 1, wherein the printed electronics method is screen printing or inkjet printing.

26. The strain gauge device according to claim 20, wherein the strain gauge for hands-on-off detection is used in a steering wheel.

27. A strain gauge device comprising:
at least three printed strain gauges on a formable substrate film, the at least three strain gauges being embedded in an injection molded material layer, wherein the device is configured for positioning a pressure applied to the formable substrate film based on the at least three printed strain gauges by triangulation.

28. The strain gauge device according to claim 27, wherein the formable substrate film has been formed to a three-dimensional shape.

29. The strain gauge device according to claim 27, comprising a controlling unit on the formable substrate film and arranged in electrical connection with the at least three printed strain gauges.

30. The strain gauge device according to claim 27, comprising a capacitive sensing device.

31. The strain gauge device according to claim 27, wherein the formable substrate film comprises metal having a resistivity higher than or equal to 0.1 micro-ohm/m, the strain gauge device further comprising an insulating layer on the formable substrate film, and wherein the at least three printed strain gauges are printed on the insulating layer.

32. A strain gauge device comprising:
a printed strain gauge on a first formable substrate film, wherein the strain gauge is embedded in an injection molded material layer; and
a second formable substrate film, wherein the molded material layer embedding the strain gauge is arranged between the first formable substrate film and the second formable substrate film.

33. The strain gauge device according to claim 32, wherein the first formable substrate film has been formed to a three-dimensional shape.

34. The strain gauge device according to claim 32, comprising a controlling unit on the first formable substrate film and arranged in electrical connection with the strain gauge.

35. The strain gauge device according to claim 32, comprising a capacitive sensing device.

36. The strain gauge device according to claim 32, wherein the first formable substrate film comprises metal having a resistivity higher than or equal to 0.1 micro-ohm/m, the strain gauge device further comprising an insulating layer on the first formable substrate film, and wherein the strain gauge is printed on the insulating layer.

37. A strain gauge device comprising:
a printed strain gauge on a formable substrate film, wherein the strain gauge is embedded in an injection molded material layer; and
a controlling unit on the formable substrate film and arranged in electrical connection with the strain gauge.

38. The strain gauge device according to claim 37, comprising a capacitive sensing device.

39. The strain gauge device according to claim 37, wherein the formable substrate film comprises metal having a resistivity higher than or equal to 0.1 micro-ohm/m, the strain gauge device further comprising an insulating layer on the formable substrate film, and wherein the strain gauge is printed on the insulating layer.

40. A strain gauge device comprising:
a printed strain gauge on a formable substrate film, the strain gauge being embedded in an injection molded material layer, wherein the formable substrate film has been formed to a three-dimensional shape.

41. The strain gauge device according to claim 40, comprising a controlling unit on the formable substrate film and arranged in electrical connection with the strain gauge.

42. A strain gauge device comprising:
a printed first strain gauge on a first formable substrate film, wherein the first strain gauge is embedded in an injection molded material layer; and
at least one second strain gauge printed on a second formable substrate film at least partly at a corresponding position with respect to the first strain gauge.

43. The strain gauge device according to claim 42, wherein the first formable substrate film comprises metal having a resistivity higher than or equal to 0.1 micro-ohm/m, the strain gauge device further comprising an insulating layer on the first formable substrate film, and wherein the first strain gauge is printed on the insulating layer.

44. A strain gauge device comprising:
a printed strain gauge on a formable substrate film, wherein the strain gauge is embedded in an injection molded material layer; and
a capacitive sensing device associated with the formable substrate film.

45. The strain gauge device according to claim 44, wherein the capacitive sensing device is configured to provide a first trigger signal, and the resistance of the strain gauge is configured to be monitored in response to the first trigger signal, or
the resistance of the strain gauge is configured to be monitored and to provide a first trigger signal, and the capacitive sensing device is configured to be monitored in response to the first trigger signal.

46. A strain gauge device comprising:
a printed strain gauge on a formable substrate film, the strain gauge being embedded in an injection molded material layer, wherein the formable substrate film includes metal having a resistivity higher than or equal to 0.1 micro-ohm/m; and
an insulating layer on the formable substrate film, wherein the strain gauge is on the insulating layer.

47. The strain gauge device according to claim 46, wherein the insulating layer includes a dielectric layer printed with dielectric ink.

\* \* \* \* \*